(12) United States Patent
Drachmann (10) Patent No.: US 10,845,223 B2
(45) Date of Patent: Nov. 24, 2020

(54) UTILITY FLOW METER WITH DISPLAY MODE CONTROLLER

(71) Applicant: APATOR MIITORS ApS, Aarhus V (DK)

(72) Inventor: Jens Drachmann, Viby J (DK)

(73) Assignee: Apator Miitors ApS, Aarhus V (DK)

( * ) Notice: Subject to any disclaimer, the term of this patent is extended or adjusted under 35 U.S.C. 154(b) by 139 days.

(21) Appl. No.: 15/689,065

(22) Filed: Aug. 29, 2017

(65) Prior Publication Data

US 2018/0058888 A1 Mar. 1, 2018

(30) Foreign Application Priority Data

Aug. 29, 2016 (EP) ..................................... 16186096

(51) Int. Cl.
| | | |
|---|---|---|
| *G01F 1/60* | (2006.01) | |
| *G01F 1/26* | (2006.01) | |
| *G01F 15/06* | (2006.01) | |
| *G01F 15/075* | (2006.01) | |
| *G01D 3/10* | (2006.01) | |
| *G01D 7/00* | (2006.01) | |

(52) U.S. Cl.
CPC ................ *G01F 1/60* (2013.01); *G01D 3/10* (2013.01); *G01F 1/26* (2013.01); *G01F 15/063* (2013.01); *G01F 15/068* (2013.01); *G01F 15/075* (2013.01); *G01F 15/0755* (2013.01); *G01D 7/00* (2013.01)

(58) Field of Classification Search
None
See application file for complete search history.

(56) References Cited

U.S. PATENT DOCUMENTS

| | | | | |
|---|---|---|---|---|
| 2004/0255690 | A1* | 12/2004 | Ueki | .......................... G01F 1/32 |
| | | | | 73/861 |
| 2007/0191990 | A1* | 8/2007 | Duan | ....................... G01F 1/667 |
| | | | | 700/282 |
| 2009/0315545 | A1* | 12/2009 | Budmiger | ................. G01F 1/58 |
| | | | | 324/229 |
| 2012/0144898 | A1* | 6/2012 | Brasel | ....................... B67D 1/12 |
| | | | | 73/40.5 R |
| 2014/0055283 | A1* | 2/2014 | Ching | ....................... H04Q 9/00 |
| | | | | 340/870.02 |

FOREIGN PATENT DOCUMENTS

| | | |
|---|---|---|
| DE | 202004009798 U1 | 9/2004 |
| EP | 0099712 A2 | 2/1984 |
| EP | 1482284 A1 | 12/2004 |
| JP | 2002267509 A | 9/2002 |
| JP | 2008281367 A | 11/2008 |

\* cited by examiner

*Primary Examiner* — Nasima Monsur
(74) *Attorney, Agent, or Firm* — Lee & Hayes, P.C.

(57) ABSTRACT

A utility flow meter and a method for measuring a flow of a liquid through a flow conduit having a liquid sensing arrangement, a display device, and a display mode controller for controlling the display mode. The display mode controller is configured to control the display mode based on a first display mode when the liquid presence criterion is fulfilled and a second display mode when the liquid presence criterion is not fulfilled. The first display mode consists of at least one flow representation, and the second display mode consists of at least one further representation.

14 Claims, 4 Drawing Sheets

UTILITY FLOW METER WITH DISPLAY MODE CONTROLLER

FIELD OF INVENTION

The invention relates to the field of flow metering, particularly to the field of utility flow meters with a display device.

BACKGROUND

Many modern utility flow meters comprise increasingly complex control software which may need to be updated. On the other hand, operators may often be concerned with verifying that utility flow meters are operating according to the relevant specifications, which may not be the case if e.g. the utility flow meter has been subject to a production error or an attempt of tampering. Moreover, while a part of such verification may include inspecting mechanical interference, e.g. by breaking of a seal, software inspection may need communication with the device, e.g. by a suitable wireless communication interface. Also, due to the complex nature of utility flow meters, it may be advantageous to convey further messages, such as status messages, to a high level user, such as a repairman or maintenance operator.

One problem with using wireless communication is that this requires a suitable receiving device and also drains power from the utility flow meter, which may be battery powered.

At the same time, it is desirable that any solution does not complicate matters for a low level user, such as a person making a visual readout of the consumption.

It is an object of the invention to overcome these disadvantages.

SUMMARY

The invention relates to a utility flow meter for measuring a flow of a liquid through a flow conduit,
the utility flow meter comprising
  a liquid sensing arrangement,
  a display device arranged to display information according to a display mode, and
  a display mode controller for controlling the display mode,
wherein the liquid sensing arrangement is arranged to measure at least when a liquid presence criterion is fulfilled and communicate a presence indication based thereon to the display mode controller,
wherein the display mode controller is configured to control the display mode based on said presence indication between at least a first display mode when the liquid presence criterion is fulfilled and a second display mode when the liquid presence criterion is not fulfilled,
wherein the display device is configured to display a first and a second display mode,
wherein the first display mode comprises at least one flow representation, and wherein the second display mode comprises at least one further representation instead of said flow representation and other than information about whether the liquid presence criterion is fulfilled.

One important advantage of the invention is that the size of the display device may be kept relatively reduced while still ensuring that appropriate information may be communicated as the further representation(s) of the second display mode. At the same time, the advantageous control of the display mode provided by the invention, facilitates targeting the information of the display mode, particularly the further representation(s) of the second display mode, towards the intended high level user, thus for example preventing confusion by a low level user by presenting complex information of the further representation not intended or needed by such low level user, while still conveying the appropriate basic information, such as e.g. the at least one flow representation, to the low level user. It is emphasized that keeping the display device at a smaller size may save energy, since the energy cost typically increases with the size. A reduced display device size may also reduce production costs, as larger display devices typically are priced at a higher level.

Here it is noted that display device size could be quantified e.g. for segment display devices by the number of display modules each showing one characters, or for dot-matrix display devices by the number of pixels. Also the size could be quantified by the number of display zones.

One significant advantage of the invention is that information other than the ordinary flow representation may be displayed when necessary without having any buttons on the flow meter. While such buttons may also be used to switch between different display modes, they also lead to a number of disadvantages, such as possible confusion for a user due to e.g. pressing the button by mistake, less effective sealing of the flow meter, increased production cost and complexity, and increased vulnerability for tampering with the flow meter due to the further accessible user interface provided by the button.

In fact, it may often be an advantage that switching between display modes is possible, but not necessarily when the meter is installed in the piping system and/or during operation/measuring of the flow meter. Thus, the end user of the flow meter, such as a building tenant or owner, may not be able to access the second display mode, at least without dismantling or uninstalling the utility flow meter, i.e. not accidentally.

Thus, the display device may comprise a display zone which is used to display the at least one flow representation in the first display mode and the further representation in the second display mode.

The display device may display various further information according to different specific embodiments. For example, the display device may often be configured to display a consumption representation being an indication of a consumption, e.g. a total lifetime consumption. The consumption may e.g. be displayed in a suitable unit, such as e.g. an appropriate volume unit, e.g. cubic meters, liters, etc.

In some embodiments the display device displays the indication of consumption both in the first and second display modes, i.e. the indication of consumption is a further consumption representation, other than the consumption representation being displayed in the first display mode and replaced in the second display mode by the further representation. This may in some cases be due to legal requirements or requirements according to industry standards etc.

In some embodiments there may exist further display modes. For example, there may exist an initial mode which is shown until e.g. operation is initiated, and which display mode may afterwards be impossible to recall, at least unless the utility flow meter is subjected to resetting.

Also, the first and/or second display modes may in some embodiments comprise sub-modes. For example, a display mode may comprise a first sub-mode comprising a first set of representations, and a second sub-mode comprising a second, different set of representations. Here, different is intended to mean not identical, i.e. including partially overlapping and non-overlapping sets of representations. One example may be that the second display mode automatically changes between two sub-modes; where said at least one further representation is a first further representation in the first sub-mode, and the at least one further representation is a second further representation in the second sub-mode, where the first and second further representations are different. Examples of a first and second further representation could be e.g. an indication of a software version and an indication of a software checksum, respectfully.

In the present context, it should be understood that when the liquid sensing arrangement to measure when a liquid presence criterion is fulfilled and communicate a presence indication based thereon to the display mode controller, the presence criterion may in some embodiments be e.g. a simple bit value signifying true or false of fulfillment of the liquid presence criterion, whereas it may in other embodiments be a more complex signal, for example as a more complex digital message which may or may not comprise further information apart from whether the liquid presence criterion is fulfilled, or it may be an analog signal from one or more sensors of the liquid sensing arrangements. Such analog signal may or may not, according to various embodiments, be processed or filtered.

It should be understood in the context of the invention that the invention provides an advantageous solution for extracting, at the intended point in time, further information from a utility flow meter via its display device, and that further interfaces for communicating such information may in some embodiments also exist. For example, a utility flow meter may be adapted for remote reading, i.e. comprise hardware and software for communicating information to a remote external receiver, including the further representations of the invention. However, the entity acquiring such utility flow meter may not necessarily be in possession of a remote external receiver for receiving the communications from the utility flow meter, e.g. due to cost saving, and but may still by virtue of the invention be able to obtain the information needed via the display device when operated in accordance with the present invention.

According to an embodiment of the invention, the liquid sensing arrangement comprises a liquid sensor and a liquid sensing controller, where the liquid sensor is arranged to measure and transmit a signal to the liquid sensing controller, and wherein the liquid sensing controller is adapted to determine when liquid is present in the flow conduit based on the transmitted signal.

In the present context, the term "utility flow meter" is intended to mean a meter measuring the flow of a liquid utility, such as e.g. water, hereunder drinking water, waste water etc., such utility flow meters may e.g. be able to calculate a consumption based on a measured flow. It should be notice that there may often be certain national or regional regulations and requirements that utility flow meters must fulfill. For example, it may often be required that the present level of accumulated consumption is displayed at all times.

In the present context, the term "flow conduit" is intended to mean a conduit through which a flow passes on which the utility flow meter is adapted to measure. The flow conduit may be formed by a pipe section having e.g. a circular, rectangular, or square cross-section.

In the present context, the term "liquid sensing arrangement" is intended to mean any arrangement which can measure at least when the liquid presence criterion is fulfilled. Examples of liquid sensing arrangements may include ultrasonic transducers, magnetically inductive flow sensors, or any other sensors that can detect if a liquid is present or not, i.e. measure a liquid presence criterion. In some embodiments, the liquid sensing arrangement is also adapted to measure the flow of liquid, e.g. when the liquid sensing arrangement comprises ultrasonic transducers or a magnetically inductive flow sensor. In other embodiments, the liquid sensing arrangement may be a dedicated arrangement or sensor, or be arranged to measure a further parameter in addition to whether the liquid presence criterion is fulfilled. The liquid sensing arrangement may in some embodiments consist of a single sensor, whereas it may in other embodiments be a distributed arrangement made up by more sensors and/or further comprise a control unit. One example of a distributed liquid sensing arrangement may comprise two ultrasonic transducers for transmitting and receiving an ultrasonic signal.

In the present context, the term "display device" is intended to mean any display device suitable for operating in accordance with the present invention. Such devices may include e.g. segment display devices and dot-matrix display devices.

In the present context, the term "display mode" is intended to mean a mode wherein the relevant display device displays information in accordance with the relevant display mode. Herein, the first display mode comprises at least one flow representation, whereas the second display mode comprises at least one further representation instead of said flow representation and other than information about whether the liquid presence criterion is fulfilled. Thus, both the first and second display modes requires at least the specified information to be displayed by the display device.

In the present context, the term "display mode controller" is intended to mean any controller suitable for controlling the display mode according to the invention. The display mode controller may be incorporated in other control units, such as e.g. a main control unit of the utility flow meter, or may be a separate unit.

In the present context, the term "liquid presence criterion" is intended to mean a threshold under which liquid is deemed to not be present in the flow conduit and over which liquid is deemed to be present in the flow conduit. In one example, the threshold may be a simple threshold value to which a measured parameter is compared to give e.g. a true or false value, or a more complex threshold where one or more measured parameters or derivatives therefrom are compared to relevant values or criteria.

For example, when the liquid sensing arrangement comprises ultrasonic transducers, the liquid presence criteria may for example be that the path of the ultrasonic signal through the liquid is unbroken by gas or air. Such breaking of the path typically results in a significant decrease in the received ultrasonic signal, which can then be interpreted as the liquid presence criterion not being fulfilled.

In practical situations, the flow conduit is typically either almost completely filled with liquid when the utility flow meter is installed or almost completely empty before installation and after uninstallation.

In the present context, the term "presence indication" is used as an indication of whether the liquid presence criterion is met or not. The presence indication may be communicated e.g. by wired transmission when the liquid sensing arrangement and the display mode controller are spaced apart. In embodiments where the at least a part of the liquid sensing arrangement and the display mode controller are integrated in the same unit, the communication of the presence indication may be realized as a command or suitable computerized message, flag or value, etc.

In the present context, the term "flow representation" is intended to refer to a representation of the flow rate. In some embodiments, the flow rate may be listed by suitable unit, in volume per time, whereas in other embodiments it may indicate the flow rate without being listed in particular units, i.e. listed in arbitrary units.

In the present context, the term "further representation" is intended to mean a representation which is not a flow representation, particularly not the flow representation of the first display mode. Examples of the further representation are plentiful and include software verification data, operational status data, expected remaining lifetime of said utility flow meter, and operational state variables. However, in the context of the present invention, the further representation cannot be a flow representation of any kind, regardless of how it is obtained, calculated etc. Thus, the second display mode comprises a further representation instead of said flow representation and other than information about whether the liquid presence criterion is fulfilled and other than said flow representation.

In the present context, the term "communicate" in the sense of the liquid sensing arrangement communicating the presence indication to the display mode controller may e.g. be understood as a transmission of the presence indication as an electrical signal in through electrical connections, such as wires and/or conductive tracks, or as communication of a digital signal or message between two digital processing units or within the same digital processing unit, e.g. as a message between two programs or parts of programs.

According to an advantageous embodiment of the invention said display device comprises at least a one display zone configured to, in said second display mode, display at least a part of said further representation, and to display said flow representation in said first display mode.

One very important advantage of the above embodiment may be that both the first and the second display modes can be displayed by the same display device while using a relatively small display device. Using a smaller display device may reduce production costs as well as conserving energy for the utility flow meter, which may be battery powered. This advantage is realized, while at the same time avoiding subjecting the end-user to unexpected information of the second display modes, by controlling the display modes according to the presence indication in accordance with the present invention.

According to an advantageous embodiment of the invention said at least one flow parameter comprises an indication of a flow value of the liquid through the flow conduit.

If the display device, during a given display mode, automatically—e.g. by timing—switches between different sub-modes, i.e. display alternating information, the total sum of the different types of information display over time is considered information displayed in the first display mode.

According to an embodiment of the invention, the first display mode does not comprise said further representation.

According to an advantageous embodiment of the invention the further representation comprises an indication of information selected from the list consisting of software verification data, operational status data, expected remaining lifetime of said flow meter, operational state variables.

Here it should be understood that operational status data comprises e.g. error messages and warnings; however, not including information about whether the liquid presence criterion is fulfilled.

According to an embodiment of the invention the further representation comprises software verification data.

Here it should be understood that software verification data may comprise software authenticity data, such as checksum data, and/or software identification data, such as software version data.

One advantage of the above embodiment may be that e.g. an operator can verify that the software version of the utility flow meter corresponds to the expected version and/or can receive an indication of whether the source code of the software corresponds to an expected value. In other words, correct software can be checked by means of verification of the authenticity and/or the identity of the software.

Examples of usable checksum algorithms for generating checksums for the above mentioned checksum data includes for example cyclic redundancy check (CRC) checksums, such as e.g. CRC16, Fletcher's checksums, Adler-32 checksums, modular checksums, etc.

According to an advantageous embodiment of the invention the first display mode and the second display mode each comprises a consumption representation.

According to an embodiment of the invention, the first and second display modes comprise the same consumption representation.

According to an embodiment of the invention, the first display mode comprising a flow representation, the second display mode comprising a further representation instead of said flow representation and other than information about whether the liquid presence criterion is fulfilled and other than said flow representation, the first and second display modes each further comprising the same consumption representation.

According to an embodiment of the invention, the first display mode comprising a flow representation, the second display mode comprising a further representation instead of said flow representation and other than information about whether the liquid presence criterion is fulfilled and other than said flow representation, the first and second display modes each further comprising the same consumption representation, the first display mode being free of said further representation, the second display mode being free of said flow representation.

According to an embodiment of the invention, said display device comprises at least a one display zone configured to display at least in the first and second display modes.

Thus, one zone of the display device may appear substantially unchanged when going from the first display mode to the second display mode, and vice versa, displaying a consumption representation in each mode.

According to an advantageous embodiment of the invention the liquid sensing arrangement is further adapted to measure the flow of the liquid through the flow conduit.

Examples of liquid sensing arrangements which may also be adapted to measure the flow of the liquid through the flow conduit, include flow measuring arrangements of ultrasonic flow meters, which comprises ultrasonic transducers, and flow measuring arrangements of magnetically inductive flow meters, comprising two electrodes positioned to come into contact with the liquid of the flow conduit.

According to an advantageous embodiment of the invention the liquid sensing arrangement comprises at least one ultrasonic transducer.

The at least one ultrasonic transducer may be adapted to measure the flow of the liquid, i.e. the utility flow meter is configured to measure the flow of the liquid using the at least one ultrasonic transducer.

According to an embodiment of the invention, the liquid sensing arrangement comprises two ultrasonic transducers. Thus, the flow meter may be an ultrasonic flow meter.

According to an advantageous embodiment of the invention the liquid sensing arrangement comprises at least one ultrasonic transducer, and wherein liquid sensing arrangement is configured to determine when the liquid presence criterion is fulfilled by determining when a signal received from the at least one ultrasonic transducer changes its relation to a threshold.

The threshold may be a predetermined threshold or it may be modified during operation.

If there is more than one ultrasonic transducer, this may apply for one or more of the ultrasonic transducers, depending on the specific design of the flow meter.

The at least one ultrasonic transducer may be adapted to measure the flow of the liquid, i.e. the utility flow meter is configured to measure the flow of the liquid using the at least one ultrasonic transducer.

In one embodiment, the signal received from the at least one ultrasonic transducer may be an electronic signal corresponding to an ultrasonic signal received by the ultrasonic transducer. Typically, such electronic signal would decrease significantly when liquid is absent in the flow conduit.

In another embodiment, the signal received from the at least one ultrasonic transducer may be an electronic signal corresponding to a measured impedance of the ultrasonic transducer when transmitting an ultrasonic signal. Typically, such electronic signal would increase when liquid is absent in the flow conduit.

Thus, when the signal changes its relation to the threshold, it means that it crosses the threshold. This can be done by changing its relation from being less than the threshold to being greater than the threshold, or vice versa.

According to an advantageous embodiment of the invention the liquid sensing arrangement comprises a magnetically inductive flow measuring arrangement.

The magnetically inductive flow measuring arrangement is further adapted to measure the flow of the liquid, i.e. the utility flow meter is configured to measure the flow of the liquid using the magnetically inductive flow measuring arrangement.

According to an advantageous embodiment of the invention the liquid sensing arrangement is separate from a flow measuring arrangement for measuring said flow.

According to an advantageous embodiment of the invention the display device is selected from the group of segment display devices and dot-matrix display devices.

According to an embodiment of the invention, the display device comprises a segment display element, such as a seven-segment display element, a fourteen-segment display element, or a sixteen-segment display element.

According to an embodiment of the invention, the display device comprises dot-matrix display elements.

According to an advantageous embodiment of the invention the utility flow meter is free from any button for switching between the first and second display modes.

According to an embodiment of the invention, the utility flow meter is free from any exterior button. Thus, there are no buttons that can be pressed by a low level user. However, there may still exist one or more buttons that are not positioned on the exterior of the utility flow meter, i.e. interior buttons, such as buttons on an internal printed circuit board (PCB).

According to an embodiment of the invention, the utility flow meter is free from any button for switching between the first and second display modes that can be pressed by a user, or at least a low level user.

According to an embodiment of the invention, the utility flow meter is free from any button for switching between the first and second display modes that can be pressed without breaking a seal.

According to an advantageous embodiment of the invention the utility flow meter is sealed.

The seal may e.g. be a mechanical seal which is physically broken, or an electronic seal which is electronically broken, i.e. a seal where suitable electronic device(s) detect an opening of the utility flow meters and store a value signifying breaking of the seal and/or transit to an external receiver such value. Thus, according to the above embodiment, the utility flow meter is sealed to prevent any unauthorized interference with the inside of the utility flow meter, at least without breaking a seal mechanically or electronically.

Breaking of a seal can then subsequently be detected by visual inspection of the mechanical seal, or by performing a read-out of the relevant value associated with breaking of the electronic seal.

The invention further relates to a method of controlling a utility flow meter, the utility flow meter being adapted for measuring a flow of a liquid through a flow conduit, the method comprising the steps of measuring when a liquid presence criterion is fulfilled, displaying a first display mode comprising at least one flow representation when said liquid presence criterion is fulfilled, and displaying a second display mode comprising further representation instead of said flow representation and other than information about whether the liquid presence criterion is fulfilled when said liquid presence criterion is not fulfilled.

In the present context, it should be understood that the above steps may not necessarily be carried out in that order, or may be carried out simultaneously and/or continuously or quasi-continuously. In any case, the utility flow meter is controlled so as to measure when a liquid presence criterion is fulfilled, and to select the first or second display mode and display the corresponding representation(s) based thereon. This cycle is then repeated with some suitable interval, such as to display the first display mode when the liquid presence criterion is fulfilled and the second display mode when it is not.

According to an advantageous embodiment of the invention the method of the invention may be used for controlling a the utility flow meter is according to the invention or any of its embodiments.

The invention further relates to a utility flow meter for measuring a flow of a liquid through a flow conduit, the utility flow meter comprising a liquid sensing arrangement, a display device arranged to display information according to a display mode, and a display mode controller for controlling the display mode, wherein the liquid sensing arrangement is arranged to measure at least when a liquid presence criterion is fulfilled and communicate a presence indication based thereon to the display mode controller, wherein the display mode controller is configured to control the display mode based on said presence indication between at least a first display mode when the liquid presence criterion is fulfilled and a second display mode when the liquid presence criterion is not fulfilled, wherein the display device is configured to display a first and a second display mode, wherein the first display mode comprises a flow representation, and wherein the second display mode comprises a further representation instead of said flow representation and other than information about whether the liquid presence criterion is fulfilled and other than said flow representation.

FIGURES

The invention will now be described with reference to the figures where.

DETAILED DESCRIPTION

Figure 1A:
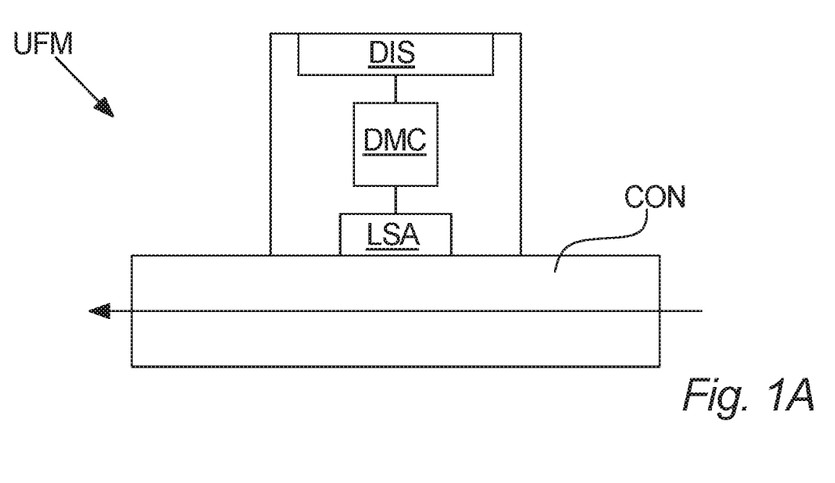
FIG. 1A illustrates a utility flow meter according to an embodiment of the invention.

Referring to FIG. 1A, a utility flow meter UFM according to an embodiment of the invention is illustrated. The utility flow meter UFM is configured to measure a flow of a liquid (indicated by the horizontal arrow) through a flow conduit CON.

The utility flow meter UFM comprises a liquid sensing arrangement LSA, a display device DIS, and a display mode controller DMC.

In operation the display device DIS displays information according to a display mode, while the display mode controller DMC controls the display mode. The information may e.g. comprise numbers, letters, other characters, or combinations thereof.

Furthermore, the liquid sensing arrangement LSA measures at least when a liquid presence criterion is fulfilled and communicates a presence indication based thereon to the display mode controller DMC. Moreover, the display mode controller DMC controls the display mode based on the presence indication between at least a first display mode when the liquid presence criterion is fulfilled and a second display mode when the liquid presence criterion is not fulfilled.

The display device DIS is configured to display a first and a second display mode.

The first display mode comprises at least one flow representation, whereas the second display mode comprises at least one further representation instead of said flow representation and other than information about whether the liquid presence criterion is fulfilled.

Figure 3:
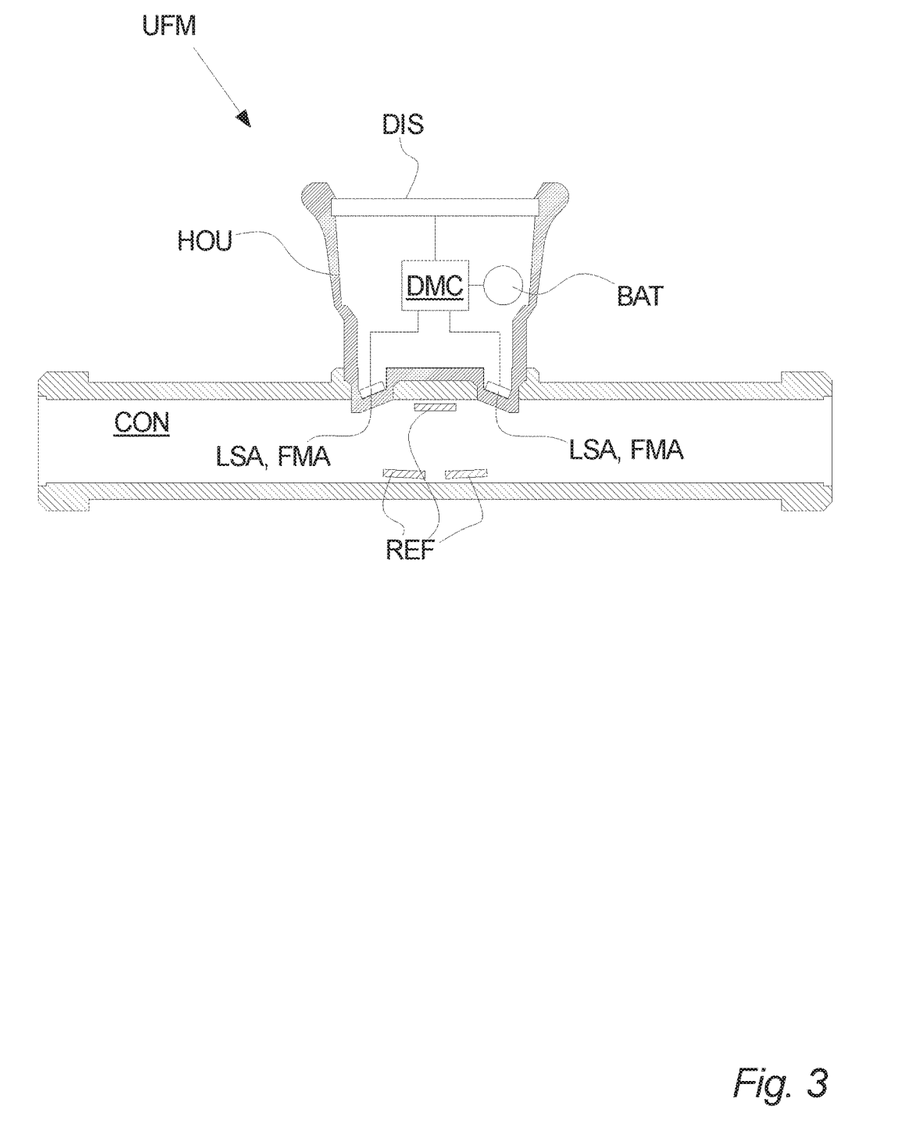
FIG. 3 illustrates a utility flow meter in the form of an ultrasonic flow meter according to an embodiment of the invention.

The utility flow meter UFM may further comprise an internal power source (not shown) for powering its operation. The internal power source may for example comprise a battery. An example of a utility flow meter UFM comprising an internal power source is shown in FIG. 3.

Moreover, the display device DIS may comprise several display zones DZN1, DZN2, DZN3. Examples thereof are illustrated in FIGS. 2A-2E.

FIGS. 1B to 1E shows different examples of parts of utility flow meters UFM according to various embodiments of the invention. These figures illustrate that the liquid sensing arrangement LSA may or may not be part of a flow measuring arrangement FMA for measuring the flow through the flow conduit CON. The shown example embodiments are to be understood in the context of the embodiment of FIG. 1A, specifically that the liquid sensing arrangement LSA as well as the flow measuring arrangement FMA are arranged in the flow conduit CON, adjacent to the flow conduit CON, or otherwise in the vicinity of the flow conduit CON so as to perform the intended measurements. These embodiments may be combined with the displays shown on FIGS. 2A-2E and may be implemented in accordance with the embodiments of FIGS. 3 and 4.

Figure 1B:
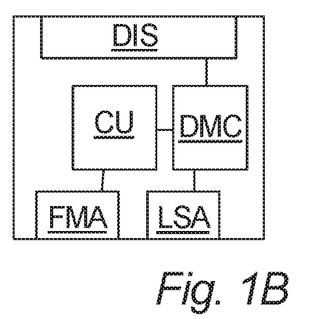
FIGS. 1B-1E illustrates parts of utility flow meters according to various embodiments of the invention.

In FIG. 1B the flow measuring arrangement FMA and the liquid sensing arrangement LSA are separate units. Also, the utility flow meter UFM comprises a control unit CU to which the flow measuring arrangement FMA communicates its measurements. The display mode controller DMC is connected to the liquid sensing arrangement LSA, so as to receive the presence indication.

The display mode controller DMC then controls the display device DIS between the first and second display modes based on the presence indication in accordance with the embodiment illustrated on FIG. 1A.

In this embodiment the display mode controller DMC is connected to the control unit CU, which in turns receives signals from the flow measuring arrangement FMA. Thus, the display mode controller DMC can receive data corresponding to the flow representation and may also control any possible additional representation(s) apart from the flow representation and the further representation(s), which additional representation(s) may be display in the first and/or second display mode. For example, the additional representation(s) may comprise a consumption representation being the total accumulated consumption displayed e.g. in both the first and the second display modes.

In this embodiment, the liquid sensing arrangement LSA may be specifically designed to measure when the liquid presence criterion is fulfilled, or alternatively it may be designed to measure an even further parameter, such as e.g. a temperature, concentration of salts, etc., from which measurement it can be deduced when the liquid presence criterion is fulfilled.

Figure 1C:
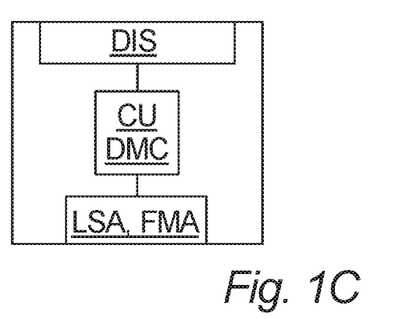

Turning to FIG. 10, this embodiment illustrates that the liquid sensing arrangement LSA and flow measuring arrangement FMA are integrated in each other, for example by being the same unit.

Moreover, FIG. 10 illustrates an integration of the control unit CU and the display mode controller DMC, which may e.g. be realized by the control unit CU being programmed to execute control of the display modes as the display mode controller in accordance with the embodiment of FIG. 1A.

It should be noted that an integration of liquid sensing arrangement LSA and flow measuring arrangement FMA as shown in FIG. 10 may also be applied with the separated control unit CU display mode controller DMC of FIG. 1B, e.g. by sending signals to the control unit CU, which then transmits the signals and/or processed parameters based thereon to the display mode controller DMC. In the same way, the separate flow measuring arrangement FMA and liquid sensing arrangement LSA of FIG. 1B may be applied with the integrated control unit CU and display mode controller DMC.

Figure 1D:
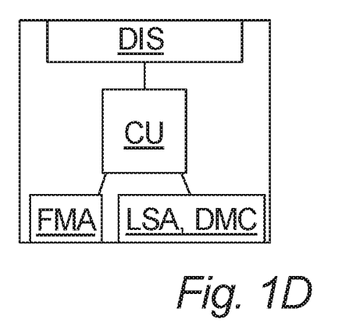

Turning to FIG. 1D, a further example embodiment is shown, where the display mode controller is integrated into the liquid sensing arrangement. Still, the presence indication is communicated internally therein in accordance with the embodiment shown on FIG. 1A.

Figure 1E:
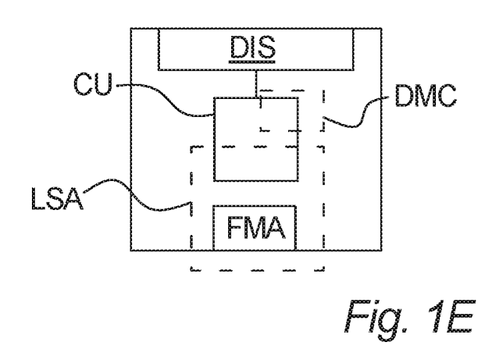

FIG. 1E illustrates yet another embodiment, where the liquid sensing arrangement LSA is distributed and comprises the flow measuring arrangement FMA, but also some part of the control unit CU, for example in the sense that some processing of the signal from the flow measuring arrangements FMA is performed in the control unit CU to establish the presence indication, which is then communicated to the display mode controller DMC. FIG. 1E shows a display mode controller DMC integrated in the control unit CU similar to FIG. 1O, but a separate display mode controller DMC, e.g. as in FIG. 1B, may also be utilized.

Referring now to FIGS. 2A-2E, display devices DIS according to various embodiments are illustrated. The illustrated display devices DIS may be employed in accordance with the utility flow meter UFM illustrated in FIG. 1A.

Figure 2A:
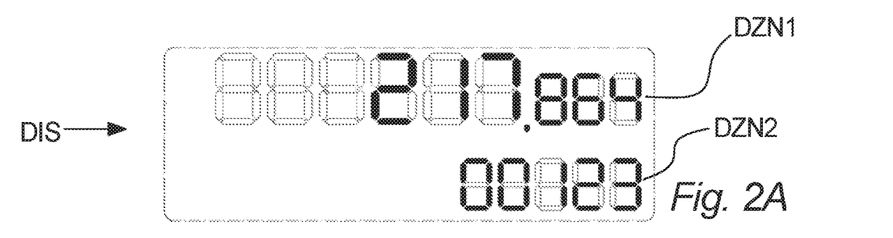
FIG. 2A-2E illustrates display devices according to various embodiments of the invention.

FIG. 2A shows a display device DIS comprising a first display zone DZN1 and a second display zone DZN2. The first display zone DZN1 displays a consumption indication in the form of an accumulated consumption in a suitable unit. In some cases, the unit may be preprinted next to the first display zone DZN1. FIG. 2A indicates an accumulated consumption as the value 217.864. The display device DIS displays a first display mode, comprising a representation. The flow representation is shown in the second display zone DZN2. The flow representation is indicated by the value 00123, and may represent a flow in a suitable unit, such as e.g. liters per hour or cubic meters per hour, which may e.g. be preprinted on the utility flow meter next to the second display zone DZN2, or it may be in arbitrary units.

Figure 2B:
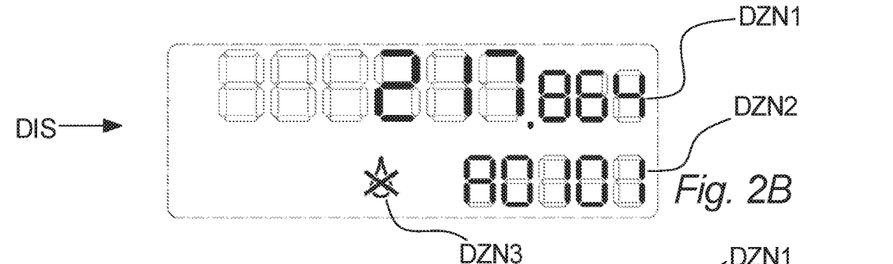

FIG. 2B shows a similar display device DIS, as that of FIG. 2A. However, the display device DIS of FIG. 2B further comprises a third display zone DZN3. FIG. 2B indicates the same value as FIG. 2A for the accumulated consumption. The display device DIS displays a second display mode, comprising a further representation. The further representation is shown in the second display zone DZN2. The further representation is not a flow representation nor information about whether the liquid presence criterion is fulfilled. In the present embodiment, the further representation is an example of software verification data, specifically software identification, more specifically software version data, shown by the value A0101. By using a non-numeral character (here the character A) as the first character, an indication is given that a flow representation is not shown. Thus, the software version may be identified by the version number 0101. In the third display zone DZN3, a symbol of a crossed-out droplet indicates that the liquid presence criterion is not fulfilled, in agreement with the second display zone DZN2 showing the further representation instead of a flow representation.

It should be noticed that display devices DIS of FIGS. 2A and 2B could be considered the same display device DIS, apart from the third display zone DZN3, displaying the first and second display mode, respectively. Thus, the display device of FIG. 2A could also have included a third display zone DZN3 with an indication of fulfillment of the liquid presence criterion as in FIG. 2B; in that case the crossed-out droplet would not have been activated.

Figure 2C:
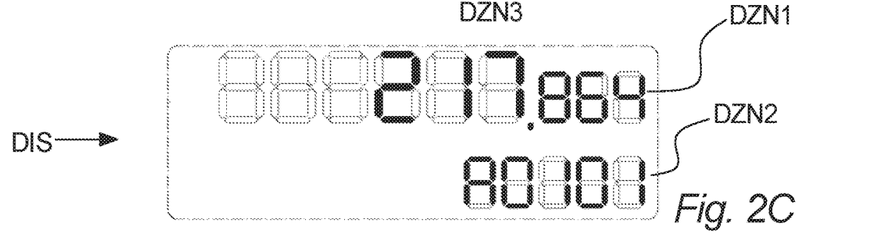

Turning to FIG. 2C, this shows a display device DIS similar to that of FIG. 2B, with the difference that the display device DIS does not comprise a third display zone DZN3. As for FIG. 2B, the display device DIS of FIG. 2C shows the second display mode, as described for FIG. 2B. Since the further representation, in this case the software version number, is indicated by a value, A0101, starting with a non-numeral character, it can readily be seen that the display device DIS shows the second display mode.

Since no third display zone DZN3 is included in the display device DIS of FIG. 2C, this display device DIS may correspond to that of FIG. 2A, where the display device DIS of FIGS. 2A and 2C shows the first and second display modes, respectively.

Figure 2D:
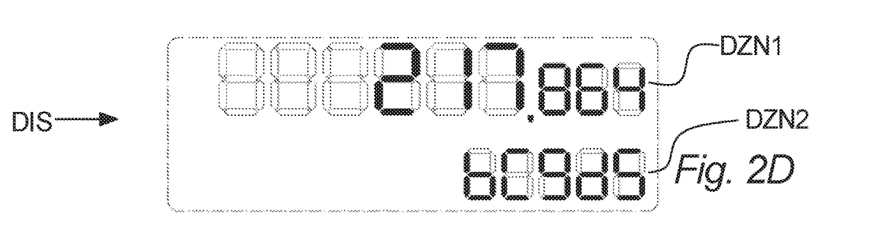

Referring now to FIG. 2D, a display device DIS similar to that of FIG. 2C is shown. This display device DIS also displays the second display mode, however, the further representation is made up by software authenticity data in the form of a checksum. The shown value is bC9d5.

In one embodiment, the first character, b, being a non-numeric character, could be used for a person reading the display to identify that the value is not a flow representation, but a further presentation instead of the flow representation. Furthermore, the specific character could be used to identify the type of further information, e.g. such that A, as in FIGS. 2B and 2C, indicates a software version number, and b, as in FIG. 2D, indicates a checksum.

Figure 2E:
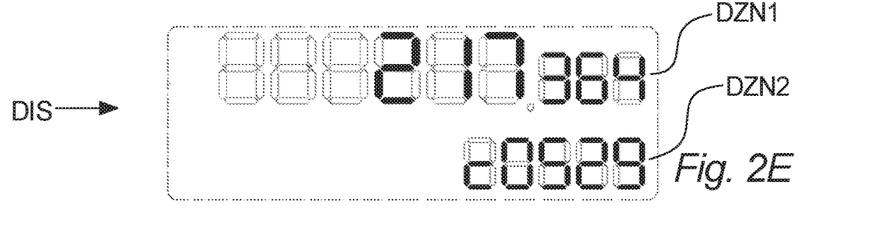

In such case, the checksum may be indicated as C9d5, which could e.g. be interpreted as a numeric hexadecimal value FIG. 2E shows another display device DIS, also displaying the second display mode, as FIGS. 2C and 2D, with the difference that the further representation in FIG. 2E is operational status data, here illustrated as an operational status code 0529, preceded by the character "c", indicating non-numeral value and second display mode.

Other possible further representations that can be displayed in the second display mode include expected remaining lifetime of the utility flow meter and operational state variables.

Turning to FIG. 3, utility flow meter UFM in the form of an ultrasonic flow meter according to an embodiment of the invention is shown. The ultrasonic flow meter of FIG. 3 is devised in line with the embodiment disclosed on FIG. 1A.

FIG. 3 shows a liquid sensing arrangement LSA comprising two ultrasonic transducers. Moreover, the ultrasonic flow meter comprises a number of ultrasound reflectors for reflecting an ultrasonic signal. In this way, the two ultrasonic transducers can transmit an ultrasound signal to each other via the ultrasound reflectors. The ultrasonic flow meter may for example measure the flow rate by means of transit time measurements, which is a well-established technology. However, when liquid is removed from the flow conduit CON, and the flow conduit CON is filled with gas (air), the efficiency of the transmission of the ultrasonic signal between the two transducers is drastically decreased. This decrease can be detected by means of the display mode controller, which in this embodiment is illustrated as a main control unit of the ultrasonic flow meter.

In this embodiment, the liquid sensing arrangement LSA also works as a flow measuring arrangement FMA.

Thereby, the display mode controller DMC can control the display device DIS according to the illustrations of FIG. 1A. Any of the display devices DIS illustrated on FIG. 2A-2E may be used.

Moreover, the utility flow meter UFM may comprise an internal power source, such as a battery, as shown on the FIG. 3. The battery BAT may power any power-consuming components directly, or via the main control unit as shown in FIG. 3.

Figure 4:
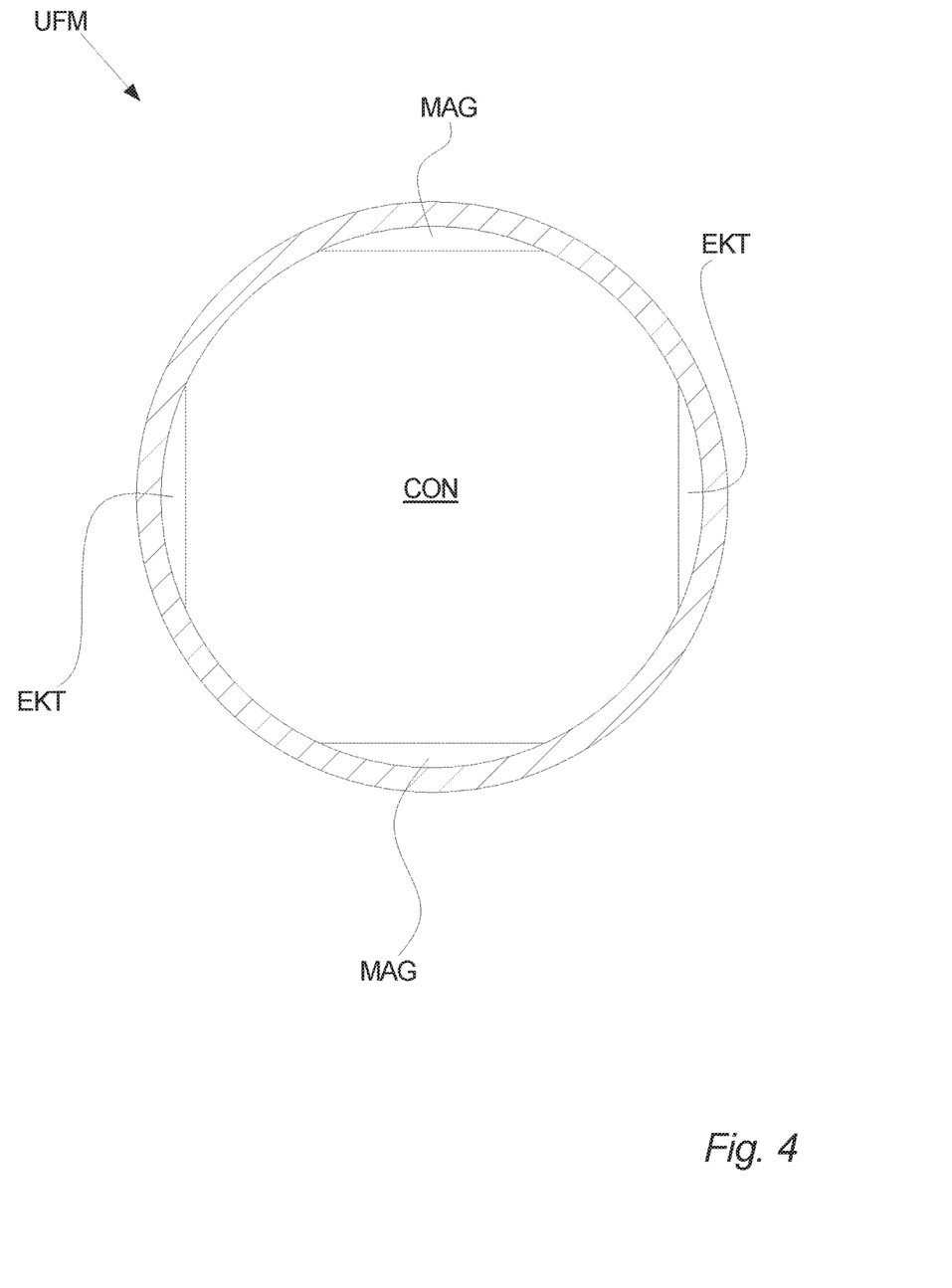
FIG. 4 illustrates a utility flow meter in the form of a magnetically inductive flow meter according to an embodiment of the invention.

Referring to FIG. 4, a further example of part of a utility flow meter UFM according to an embodiment of the invention is shown. The shown utility flow meter UFM is operated in accordance with the embodiment illustrated on FIG. 1A.

FIG. 4 shows a transversal cross-sectional view of a flow conduit CON, in which two magnets MAG are positioned opposite to each other when seen along the longitudinal axis of the flow conduit CON. Thereby, the two magnets can be oriented and/or operated so as to have opposing polarity facing towards the flow conduit CON thereby defining a magnetic field between the two magnets MAG in the flow conduit CON, in FIG. 4 having a substantially vertical direction. When a flow of a liquid comprising charged ions are flowing through the flow conduit CON are influenced by the Lorentz force in a direction perpendicular to both their own direction of movement, i.e. the flow direction, and to also perpendicular to the magnetic fields. Thus, in FIG. 4, assuming straight flow parallel to the longitudinal direction of the flow conduit CON, the ions would be influenced by a towards either of the two electrodes EKT, depending on their charge being negative or positive, thus leading to a different in electric potential between the two electrodes EKT. Since the magnitude of the Lorentz force is proportional to the velocity of the ions, by measuring the electric potential between the two electrodes EKT an indication of the flow velocity of the ions and hence the liquid is obtained.

Now, by measuring the difference in electrical potential or the impedance between the two electrodes, and indication of whether the flow conduit CON is filled with liquid or not is obtained, since both parameters changes to completely different values when the flow conduit CON is filled with air. No magnets are required to perform this measurement, thus when using electromagnets these may be turned off.

The utility flow meter UFM of FIG. 4 may be controlled and operated in accordance with the embodiments illustrated on FIGS. 1B-1E, and may comprise a housing (not shown) comprising the display mode controller DMC and further control unit(s) CU, if any.

LIST OF FIGURE REFERENCES

UFM. Utility flow meter
CON. Flow conduit
LSA. Liquid sensing arrangement
DIS. Display device
DMC. Display mode controller
DZN. Display zone
REF. Ultrasound reflector
BAT. Battery
FMA. Flow measuring arrangement
CU. Control unit

The invention claimed is:

1. A utility flow meter for measuring a flow of a liquid through a flow conduit, the utility flow meter comprising
a liquid sensing arrangement,
a display device arranged to display information according to a display mode, the display device having a first display zone for displaying a consumption indication, a second display zone for displaying at least one flow representation, and a third display zone for displaying at least one further representation, and
a display mode controller for controlling the display mode,
wherein the liquid sensing arrangement is arranged to measure at least when a liquid presence criterion is fulfilled and communicate a presence indication based thereon to the display mode controller,
wherein the display mode controller is configured to control the display mode based on said presence indication between at least a first display mode when the liquid presence criterion is fulfilled and a second display mode when the liquid presence criterion is not fulfilled,
wherein the display device is configured to display the first and the second display mode,
wherein the first display mode comprises the at least one flow representation,
wherein the second display mode comprises the at least one further representation instead of a flow representation and other than information about whether the liquid presence criterion is fulfilled, and
wherein the further representation comprises an indication of information selected from the list consisting of software verification data, operational status data, expected remaining lifetime of said flow meter, operational state variables.

2. The utility flow meter according to claim 1, wherein said display device, in said second display mode, display at least a part of said further representation, and to display said flow representation in said first display mode.

3. The utility flow meter according to claim 1, wherein said at least one flow parameter comprises an indication of a flow value of the liquid through the flow conduit.

4. The utility flow meter according to claim 1, wherein the first display mode and the second display mode each comprises the consumption representation.

5. The utility flow meter according to claim 1, wherein the liquid sensing arrangement is further adapted to measure the flow of the liquid through the flow conduit.

6. The utility flow meter according to claim 1, wherein the liquid sensing arrangement comprises at least one ultrasonic transducer.

7. The utility flow meter according to claim 1, wherein the liquid sensing arrangement comprises at least one ultrasonic transducer, and wherein liquid sensing arrangement is configured to determine when the liquid presence criterion is fulfilled by determining when a signal received from the at least one ultrasonic transducer changes its relation to a threshold.

8. The utility flow meter according to claim 1, wherein the liquid sensing arrangement comprises a magnetically inductive flow measuring arrangement.

9. The utility flow meter according to claim 1, wherein the liquid sensing arrangement is separate from a flow measuring arrangement for measuring said flow.

10. The utility flow meter according to claim 1, wherein the display device is selected from the group of segment display devices and dot-matrix display devices.

11. The utility flow meter according to claim 1, wherein the utility flow meter is free from any button for switching between the first and second display modes.

12. The utility flow meter according to claim 1, wherein the utility flow meter is sealed.

13. A method of controlling a utility flow meter,
the utility flow meter for measuring a flow of a liquid through a flow conduit,
the method comprising the steps of
measuring when a liquid presence criterion is fulfilled by a liquid sensing arrangement, and communicating by the liquid sensing arrangement a presence indication based thereon to a display mode controller,
displaying by a display device, information according to a display mode, the display device having a first display zone for displaying a consumption indication, a second display zone for displaying at least one flow representation, and a third display zone for displaying at least one further representation,
controlling the display mode by the display mode controller, wherein controlling the display mode based on said presence indication between at least a first display mode when the liquid presence criterion is fulfilled and a second display mode when the liquid presence criterion is not fulfilled, displaying by the display device, the first display mode comprising the at least one flow representation when said liquid presence criterion is fulfilled, and displaying by the display device, the second display mode comprising the at least one further representation instead of a flow representation and other than information about whether the liquid presence criterion is fulfilled when said liquid presence criterion is not fulfilled, wherein the further representation comprises an indication of information selected from the list consisting of software verification data, operational status data, expected remaining lifetime of said flow meter, operational state variables.

14. A utility flow meter for measuring a flow of a liquid through a flow conduit, the utility flow meter comprising a liquid sensing arrangement, a display device arranged to display information according to a display mode, the display device having a first display zone for displaying a consumption indication, a second display zone for displaying at least one flow representation, and a third display zone for displaying at least one further representation, and a display mode controller for controlling the display mode, wherein the liquid sensing arrangement is arranged to measure at least when a liquid presence criterion is fulfilled and communicate a presence indication based thereon to the display mode controller, wherein the display mode controller is configured to control the display mode based on said presence indication between at least a first display mode when the liquid presence criterion is fulfilled and a second display mode when the liquid presence criterion is not fulfilled, wherein the display device is configured to display the first and the second display mode, wherein the first display mode comprises the at least one flow representation, herein the second display mode comprises the at least one further representation instead of a flow representation and other than information about whether the liquid presence criterion is fulfilled and other than said the flow representation, and wherein the further representation comprises an indication of information selected from the list consisting of software verification data, operational status data, expected remaining lifetime of said flow meter, operational state variables.

* * * * *